(12) United States Patent
Klaedtke et al.

(10) Patent No.: US 10,374,870 B2
(45) Date of Patent: Aug. 6, 2019

(54) EFFICIENT ACCESS CONTROL FOR TRIGGER EVENTS IN SDN

(71) Applicant: NEC EUROPE LTD., Heidelberg (DE)

(72) Inventors: Felix Klaedtke, Heidelberg (DE); Ghassan Karame, Heidelberg (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 15/109,646

(22) PCT Filed: Jun. 17, 2014

(86) PCT No.: PCT/EP2014/062725
§ 371 (c)(1),
(2) Date: Jul. 4, 2016

(87) PCT Pub. No.: WO2015/192892
PCT Pub. Date: Dec. 23, 2015

(65) Prior Publication Data
US 2016/0337164 A1 Nov. 17, 2016

(51) Int. Cl.
*H04L 12/851* (2013.01)
*H04L 12/24* (2006.01)
*H04L 29/06* (2006.01)

(52) U.S. Cl.
CPC .......... *H04L 41/06* (2013.01); *H04L 47/2483* (2013.01); *H04L 69/22* (2013.01)

(58) Field of Classification Search
CPC .......... H04L 41/06; H04L 47/24; H04L 69/22
USPC .......................................................... 709/225
See application file for complete search history.

(56) References Cited

U.S. PATENT DOCUMENTS

| 2014/0052836 A1* | 2/2014 | Nguyen | H04L 45/306 709/223 |
| 2014/0075498 A1 | 3/2014 | Porras et al. | |
| 2014/0075519 A1* | 3/2014 | Porras | H04L 63/107 726/4 |

(Continued)

OTHER PUBLICATIONS

Andrew D Ferguson et al: "Hierarchical policies for software defined networks", Hot Topics in Software Defined Networks, ACM, Aug. 13, 2012 (Aug. 13, 2012), pp. 37-42, XP058008061.

(Continued)

*Primary Examiner* — Glenford J Madamba
(74) *Attorney, Agent, or Firm* — Leydig, Voit & Mayer, Ltd.

(57) ABSTRACT

A method of providing access control for a software defined network (SDN) controller includes triggering, by the SDN controller upon receiving a trigger event from a data plane of the software defined network, one or more applications that are installed to run at a control plane of the software defined network atop the SDN controller to react to the trigger event, applying, by the SDN controller before triggering applications due to a trigger event, a conflict resolution scheme. The conflict resolution scheme includes determining all flow spaces that are affected by the trigger event and selecting from these flow spaces a single selected flow space that complies with a predetermined policy, determining, a single master application according to predefined criteria, and triggering, in addition to the master application, only those applications whose reactions to the trigger event do not conflict with the master application.

18 Claims, 2 Drawing Sheets

(56) References Cited

U.S. PATENT DOCUMENTS

| | | | | |
|---|---|---|---|---|
| 2015/0149656 A1* | 5/2015 | McMurry | ............... | H04L 45/00 |
| | | | | 709/238 |
| 2015/0312215 A1* | 10/2015 | Kher | ..................... | H04L 45/30 |
| | | | | 726/11 |
| 2017/0034058 A1* | 2/2017 | Sampath | ............. | H04L 12/6418 |

OTHER PUBLICATIONS

Andrew D Ferguson et al: "Participatory networking", SIGCOMM, ACM, Aug. 27, 2013 (Aug. 27, 2013), pp. 327-338, XP058030620.
Philip Porras et al: "A security enforcement kernel for OpenFlow networks", Hot Topics in Software Defined Networks, ACM, Aug. 13, 2012 (Aug. 13, 2012), pp. 121-126, XP058008075.

* cited by examiner

● flow spaces with triggered applications
○ flow spaces without triggered applications

EFFICIENT ACCESS CONTROL FOR TRIGGER EVENTS IN SDN

CROSS REFERENCE TO RELATED APPLICATIONS

This application is a U.S. National Stage Application under 35 U.S.C. § 371 of International Application No. PCT/EP2014/062725 filed on Jun. 17, 2014. The International Application was published in English on Dec. 23, 2015 as WO 2015/192892 A1 under PCT Article 21(2).

FIELD

The present invention relates to a method of providing access control for a software defined network (SDN) controller. Furthermore, the present invention relates to a software defined network (SDN) with access control comprising a controller.

BACKGROUND

Managing and controlling network traffic is undergoing a major change, which manifests itself in software defined networking (SDN). At the core of SDN is the separation between the network's data plane and its control plane. At the data plane, network packets are physically shipped from one network component to the next until they reach their destination. The control plane comprises a logically centralized software entity—the SDN controller—running on commodity hardware. Today's controllers like NOX (see, for reference, N. Gude et al.: "NOX: Towards an operating system for networks", ACM SIGCOMM Computer Communication Review, 38(3):105-110, 2008) and Beacon (see, for reference, D. Erickson: "The Beacon OpenFlow controller", in Workshop on Hot Topics in Software Defined Networking (HotSDN), 2013) provide an abstract view on the network and an interface based on the programming model defined by the OpenFlow standard (see, for reference, OpenFlow switch specification—version 1.0.0, Open Networking Foundation, 2009). OpenFlow provides the means to program the switches, which the controller uses to interact with the data plane. Network applications, e.g., for managing and analyzing the network, run atop of the controller.

Sharing network resources with user groups, divisions, or even other companies in software defined networking (SDN) is recently gaining increasing attention, owing to its promises for better network utilization. Resource sharing is effectively realized in SDN by empowering the involved parties at the control plane with permissions for administrating network components or parts thereof. Different tenants can lease a network slice (and therefore share the network resources) by installing and running their own application atop the network owner's controller using a so-called north-bound API (Advanced Programming Interface). These different tenants usually share network resources and at the same time might also compete among each other.

In this case, restricting the access of the network users (i.e., the network owner and the leasing tenants) and the applications to the network components emerges as a necessity to ensure the correct operation of the SDN network. While some existing proposals (for instance R. Sherwood et al.: "Can the production network be the testbed?", in Symposium on Operating Systems Design and Implementation (OSDI), 2010, or P. Porras et al.: "A security enforcement kernel for OpenFlow networks", in Workshop on Hot Topics in Software Defined Networks (HotSDN), 2012) include best-effort mechanisms for restricting the access to the network resources, these mechanisms are limited in their scope, do not scale with the number of applications, and it is not clear what kind of access control policies can be realized by them.

SUMMARY

In an embodiment, the present invention provides a method of providing access control for a software defined network (SDN) controller. The method includes triggering, by the SDN controller upon receiving a trigger event from a data plane of the software defined network, one or more applications that are installed to run at a control plane of the software defined network atop the SDN controller to react to the trigger event; and applying, by the SDN controller before triggering applications due to a trigger event, a conflict resolution scheme. The conflict resolution scheme includes defining flow spaces on the basis of packet headers and assigning each flow space a priority; determining all flow spaces that are affected by the trigger event and selecting from these flow spaces a single selected flow space having assigned a priority that complies with a predetermined policy; determining, from the applications related to the selected flow space, a single master application according to predefined criteria; and triggering, in addition to the master application, only those applications whose reactions to the trigger event do not conflict with the master application.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
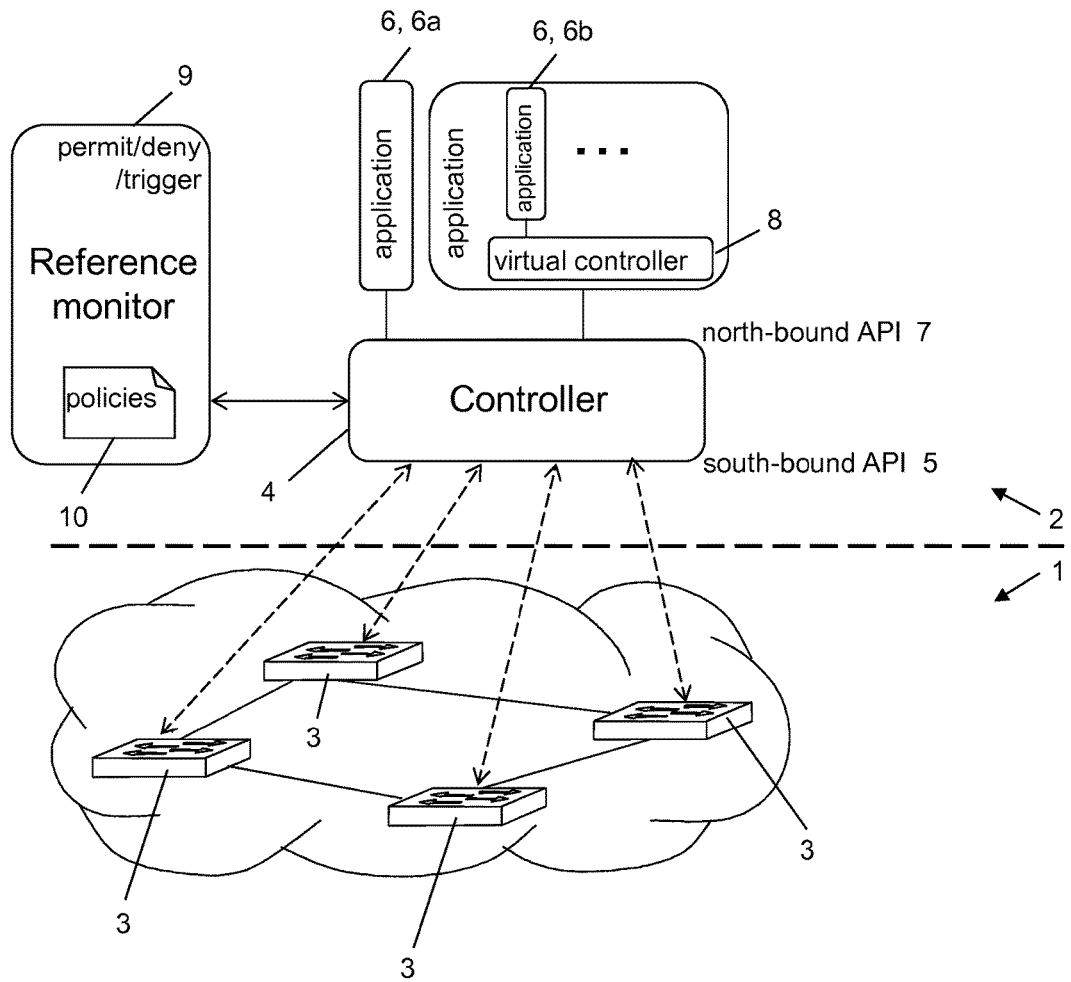
FIG. 1 is a schematic illustrating an SDN controller architecture enhanced by an access control mechanism in accordance with an embodiment of the present invention.

In an embodiment, the present invention provides a method of providing access control for a software defined network (SDN) controller and a software defined network (SDN) with access control of the initially described type in such a way that the access to the SDN controller is restricted in an efficient and flexible way, thereby ensuring correct operation of the SDN network and securing it.

According to an embodiment, a controller, before triggering applications due to a trigger event, applies a conflict resolution scheme comprising the steps of defining flow spaces on the basis of packet headers and assigning each flow space a priority, determining all flow spaces that are affected by said trigger event and selecting from these flow spaces a single flow space having assigned a priority that complies with a predetermined policy, and determining, from the applications related to said selected flow space, a single application (master application) according to pre-defined criteria and triggering, in addition to said master application, only those applications whose reactions to said trigger event do not conflict with said master application. According to another embodiment, a network is characterized in that a controller is configured, before triggering applications due to a trigger event, to apply a conflict resolution scheme comprising the steps of defining flow spaces on the basis of packet headers and assigning each flow space a priority, determining all flow spaces that are affected by said trigger event and selecting from these flow spaces a single flow space having assigned a priority that complies with a predetermined policy, and determining, from the applications related to said selected flow space, a single application (master application) according to pre-defined criteria and triggering, in addition to said master application, only those applications whose reactions to said trigger event do not conflict with said master application.

According to an embodiment of the invention it has first been recognized that an efficient realization of a comprehensive access control scheme for SDN controllers can be realized by implementing conflict resolution before triggering applications due to trigger events. Generally, according to embodiments of the invention, conflict resolution is done by first determining one of the applications when receiving a message requesting an action from the control plane and then triggering only the applications that cannot conflict with this application on the received message.

The access control scheme according to an embodiment of the present invention enables a logically centralized network controller to administrate, with minimum overhead, network resources like switches, is low-level in the sense that it is close to the south-bound API of the controller, which interfaces directly with network resources, e.g. using OpenFlow. In other words, the approach of an embodiment of the invention is to control access to the network resources at the control plane but as close as possible to the data plane. By doing so, the proposed access control scheme has a complete view over the data plane, which simplifies policy enforcement with conflict resolution. The advantages of this design choice are that (a) the OpenFlow standard is already well established and (b) other network abstractions are not yet that well understood or defined. In fact, it is to be expected that future north-bound APIs in SDN will support multiple different abstractions of the network at the control plane. Furthermore, any such interface will be built on top of the interface provided by OpenFlow that directly interacts with the network components. Therefore, since conflicts are easier to detect and resolve close to the southbound interface, access control at higher layers will utilize our access control scheme and complement it.

According to a preferred embodiment the flow spaces are hierarchically organized in a tree-based data structure. Such hierarchical organization enables convenient traversing of the various flow spaces in order to efficiently resolve conflicts prior to triggering applications.

In a preferred embodiment it may be provided that a flow space is defined as a tuple comprising a parameter that specifies a set of packet headers, thus defining the components of the flow space, a parameter that specifies a set of actions, and a parameter that specifies a set of attributes, e.g. related to valid priority and/or timeout values.

According to an embodiment it may be provided that priority is given to flow spaces that are more local with respect to the flow space hierarchy. Such policy with respect to priorities proves to be advantageous as local flow spaces, i.e. the subtrees in case of organizing flow spaces in a tree-based data structure, have more detailed knowledge of the local situation which the application(s) potentially to be triggered might affect. On the other hand, according to an alternative embodiment it may be provided that policies are specified that assign highest priorities to flow spaces that are more global with respect to the flow space hierarchy. Such policy with respect to priorities may also prove to be advantageous under certain circumstances considering that the global flow spaces have the highest power of decision.

After having selected a flow space, either a local or a global flow space with respect to the flow space hierarchy, it may be provided that the application with the highest priority is determined, from the applications related to the selected flow space, as master application. This master application is triggered in any case. Furthermore, it may be provided that, additionally, those applications are triggered that are related to the selected flow space and whose reactions to the trigger event do not conflict with the master application.

According to embodiments of the invention users may be empowered to install and run their own applications at the control plane atop said controller. For instance, the SDN controller may comprise a north-bound API (Advanced Programming Interface) that is configured to be employed by users for installing and running their applications. Since a common north-bound API and the resulting deployment of various third-party applications poses new security threats in SDN (indeed, "malicious" applications can leverage such API and infiltrate the SDN network), the conflict resolution scheme according to the present invention proves to be particularly useful in these cases.

According to a preferred embodiment, in order to handle conflicts efficiently, the installation or subscription of an application may also include the specification of reactions of that application. Preferably, the controller may comprise a reference monitor that is configured to execute the conflict resolution scheme, e.g., to resolve conflicts that can originate from multiple replies of controller applications to messages from the network switches to the control plane. In particular, the reference monitor may be configured to pre-compute the applications that are in conflict with each other (in terms of their reactions). This computation may be executed each time a new application is being subscribed or installed at the controller.

Preferably, the trigger events that are considered by the conflict resolution scheme according to the present invention may include packet-in events sent by a switch of the software defined network to the controller when the switch receives a packet that does not match any of the entries in the switch's flow table.

FIG. 1 schematically illustrates a network architecture that deploys SDN technology, which is enhanced by an access control mechanism in accordance with an embodiment of the present invention. As can be obtained from FIG. 1, SDN involves the separation between the network's data plane 1 and its control plane 2. At the data plane 1, network resources, in particular switches 3, forward packets from one network component to the next until the packets reach their destination. At the control plane 2, a logically centralized software entity—SDN controller 4—having an abstract view on the network interfaces directly (for instance, via southbound API 5) with the network resources, in particular for programming the switches' 3 flow tables, e.g. by using OpenFlow.

Network applications 6, e.g., for managing and analyzing the network, run atop of the controller 4. However, existing controllers do not expose a common interface for applications and applications need therefore to be redeveloped for different controllers. To overcome this limitation, organizations—such as the Open Networking Foundation (ONF)—started defining and standardizing a north-bound API, i.e., an interface provided by a controller for interacting with applications (see, for reference, S. Raza and D. Lenrow. North bound interface working group charter. Open Networking Foundation, 2013. www.opennetworking.org/images/stories/downloads/working-groups/charter-nbi.pdf). The reliance on a north-bound API is expected to shape the large-scale deployment of SDN, where multiple (third-party) applications interface with the same controller, providing better resource utilization and management.

As can be obtained from FIG. 1, in the illustrated embodiment the controller 4 comprises a north-bound API 7 for interacting with applications 6 either directly (like with application 6a) or via a virtual controller 8 (like with applications 6b). In either case, a common north-bound API 7 poses several threats in SDN. These threats become particularly evident when network resources are shared with user groups, divisions or even other companies. Resource sharing is effectively realized by empowering these parties at the control plane 2 with permissions for administrating network components or parts thereof, i.e. the network owner "leases" network slices, which are administrated by the leasing tenants by installing their own, possibly third-party, applications atop of the network owner's SDN controller 4. However, since the network resources at the data plane 1 are shared and the different parties can have competing objectives, conflicts between the users may arise, e.g., about the network components' configurations. For instance, when users (i.e., network administrators) subscribe applications 6 that are triggered by messages sent from a switch 3 to the controller 4 (e.g., a packet-in event is sent by a switch 3 to the controller 4 when the switch 3 receives a packet that does not match any of the entries in its flow table), such messages can trigger multiple applications 6 and each of the applications 6 can react to this message differently. Embodiments of the present invention provide effective means for resolving conflicts between users in order to ensure correct operation of the SDN network.

In the sequel, the rules that are installed by the controller 4 (e.g., via OpenFlow messages, indicated in FIG. 1 by the dashed line arrows) in the switches' 3 flow tables are denoted by flow table entries. Each such entry consists of a match set that determines to which packets the rule applies, an action set that defines how matching packets are processed, a priority field, and possibly hard or idle timeout values. Switches 3 can also send messages to the controller 4. For instance, a switch 3 can be configured to send a 'packet-in' message to the controller 4 whenever it receives a packet that has no matching flow table entry. The controller 4 then triggers an application 6, running atop of the controller 4, to react to this message.

In the context of the embodiment illustrated in FIG. 1 it is assumed that, as in most access control schemes, the entities of the access control scheme described in detail hereinafter are classified as subjects and objects. The subjects of the access control scheme are the entities that manipulate objects, namely, users. Usually there is a special subject, the network administrator, which has complete control over the controller 4. It is remarked that applications 6 are not subjects; they are executed on behalf of users (i.e., the subjects) and the user running an application 6 manipulates the objects. They have therefore the permissions of the users. For example, the same monitoring application can be executed by different users, with different permissions. The switches 3, the ports, the flow tables of the switches 3, and the flow table entries are objects of the scheme. Although ports and flow tables are components of the switches, they can be treated as separate logical entities, allowing to differentiate between the different ways to interact with switches 3.

An access control policy that assigns permissions to subjects to access objects (e.g. that specifies who can subscribe applications 6) is enforced by a reference monitor 9 which, in addition, also enforces several other access control policies 10, as will be described in detail below. In the following, the permissions are described that can be assigned to subjects, whereby restricting the actions they can perform. Actions consist of requests to objects and to the events triggered by the objects. For example, a subject can request to subscribe an application 6 to be triggered by a packet-in event (e.g., an OpenFlow message of type OFPT_PACKET_IN).

Instead of having a separate permission for each message type, it can be advantageous to take a more high-level approach and introduce only few permissions for accessing the objects, where several message types are grouped together. Another advantage is that policies 10 remain manageable since only few permissions are assigned to subjects. Furthermore, it is pointed out that the permissions not only restrict the communication between the control plane 2 and 10 the data plane 1. They also concern, e.g., the information the controller 4 is allowed to provide to subjects.

Similar to read and write permissions in an operating system for accessing the content of files, permissions are defined for reading statistics, requesting information about the state of a switch 3 and modifying its state, and subscription permissions. These permissions are named stat, config_read, config_mod, and subscr permissions. For instance: (1) a subject who has the config_read permission for a flow table can obtain a list of all the entries of that flow table, and the config_read permission is necessary to read a flow table entry's match set or priority, (2) the config_mod permission allows a subject to change the switches' 3 configuration, and (3) the subscr permission for a port allows a subject to subscribe an application 6, which is then triggered whenever the status of the port changes. As will be easily appreciated by those skilled in the art, alternative and additional permissions may be defined and the set of permissions that is actually considered by the access control scheme may thus be altered accordingly.

A policy 10 lists the assigned permissions to the subjects. The policy 10 is centrally administered by the network administrator who assigns and revokes permissions by adding and deleting list entries. Policy enforcement is done at the control plane 2, close to the interface between the control plane 2 and the network components 3, by equipping the SDN controller 4 with a reference monitor 9. It is pointed out that the data plane 1 is not affected by such a controller extension, since the reference monitor 9 only filters out some messages or sanitizes them at the control plane 2 according to the given policy 10.

Before the controller 4 performs an action (e.g., sending a message to a switch 3 or subscribing an application 6 to packet-in messages), it invokes the reference monitor 9, which performs policy enforcement by checking whether the action complies with the given policies 10 and, consequently, permits or denies the actions. For example, before the controller 4 sends an OpenFlow message to a switch 3, the reference monitor 9 checks whether the subject has the permissions (e.g. stat, config_read, and config_write) for doing so. It is noted that the reference monitor 9 must be aware of the subject that wants to send the message. Handling subscr permissions only indirectly affects OpenFlow messages. The reference monitor 9 also resolves conflicts when multiple applications 6 react to a packet-in message, and it only triggers the applications 6 that are not in conflict with another triggered application 6 with a higher priority according to the given policy 10, as will be explained in detail below. Whenever a subject subscribes an application 6 to a trigger event, the reference monitor 9 checks whether the subject has the permissions for doing so. It is noted that in case multiple applications 6 are subscribed to the same trigger event (e.g., an OpenFlow message of type OFPT_PACKET_IN), normally all these applications 6 would be triggered. However, this might lead to conflicts, for instance, if two applications 6 are triggered by a packet-in event and one application 6 wants to drop the packet and the other one wants to forward it to some port. Embodiments of the present invention are directed to efficiently resolve these conflicts, as will be described in detail below.

Embodiments of the invention are based on the introduction of new objects which replace flow tables and flow table entries, and are not physical entities of the data plane 1. These new objects, termed hereinafter 'flow rules' and 'flow spaces', only exist on the control plane 2 and are managed by the controller 4. The new objects allow having more fine-grained access control on the network resources, as will be explained below.

Generally, a flow rule can be understood as an annotated flow table entry. Formally, allow rule (FR) may be constructed as a tuple (match, act, attr), where match is a set of packet headers against which incoming packets are matched, act is a finite set of actions that a switch 3 performs when this rule applies, and attr are the attributes of the FR. Attributes appearing in the current OpenFlow standard for flow table entries are an entry's priority, its timeout values, and whether a message must be sent to the controller 4 when the entry is removed from the flow table. Hereinafter, the terms flow rule and flow table entry are used interchangeably, assuming that each flow rule corresponds to exactly one flow table entry.

The introduction of the concept of 'flow spaces' in accordance with embodiments of the invention allow to hierarchically structuring flow tables. Applications can be attached to the flow spaces. This corresponds to subscribing an application to a trigger event. For instance, an attached application is triggered whenever there is a packet-in message for a packet that falls into the respective flow space. In the context of the conflict resolution scheme, a policy may be specified that makes trigger events relative to flow spaces.

Formally, allow space (FS) may be constructed as a tuple (heads, acts, attrs), where heads is a set of packet headers, acts is a set of actions, and attrs is a set of attributes of FRs. With attrs it is possible, e.g., to specify ranges of valid priorities and timeout values; only FRs with priorities in this range can be assigned to the FS. It is defined that an FR r=(match, act, attr) is valid for the FS S=(heads, acts, attrs) if match ⊆ heads, act ⊆ acts, and attr E attrs. The FS S1 is a subspace of the FS S2 if S1's components are pointwise included in S2's corresponding components. The FSs S1 and S2 are overlapping if heads1 n heads2☐0, where headsi is the first component of Si, for i∈{1, 2}.

Allow space table (FST) is a tree, where each inner node is annotated with a FS and each leaf is annotated with either a FS or a FR such that for every inner node N with FS S, it holds that (i)r is valid for S if r is the FR of a child of N and (ii) S' is a subspace of S if S' is the FS of a child of N. Intuitively, an FST is similar to a directory tree in an operating system, where the FRs correspond to files and the FSs correspond to subdirectories, which also specify which entries are allowed to be contained in it. The semantics of an FST is given by the flow table that contains all its FRs. It is noted that the order is irrelevant since the FRs' priority specifies which FR applies in case a packet matches multiple FRs. It is assumed that the controller 4, in addition to the FSTs of the switches 3, stores and manages meta-information about the nodes in the FSTs. Simple examples of such meta-information are who created a node and when, which the controllers' 4 reference monitor 9 may use for policy enforcement.

Triggering multiple applications 6, given a single event from a switch 3, becomes problematic when the applications' 6 reactions are conflicting. For instance, assume that one application 6, triggered by a packet-in event, wants to drop the packet, while another one, triggered by the same event, wants to install a FR that forwards the packet to a given port. These two applications 6 might even be subscribed in different but overlapping FSs. Such conflicts must be prevented or resolved quickly. It is assumed that the controller 4 can correlate an application's 6 reaction with the event that caused it, e.g., by including identifiers to messages.

Generally, conflicts can be resolved statically or dynamically. In the static approach the reference monitor 9 may check, before permitting the subscription of an application 6, whether the application's 6 reactions might conflict with the reactions of the already subscribed applications 6. To perform this check, it is required that the subscriber specifies the reactions of the subscribed application 6 (it may be provided that unspecified reactions of an application 6 will be ignored by the controller 4). Although this approach prevents conflicts, it might be too conservative. A dynamic approach in accordance with the present invention is more liberal. Here, the applications' 6 reactions are prioritized and only the ones that are not in conflict with a reaction of a higher priority are carried out. Priorities for resolving conflicts can, e.g., be determined by the subscribers or the FSs if the trigger event is originating from a FR (the network administrator assigns priorities to the subjects or FSs). Priority can also be given to FSs deeper or higher in the FST. Conflicts can also be first resolved locally, i.e., within each FS, before resolving the conflicts of applications 6 subscribed to different FSs. The method for resolving local and global conflicts does not need be the same.

The access control scheme according to the present invention implements efficient conflict resolution before triggering the applications due to a trigger event. Embodiments of the scheme are based on an efficient tree-based data structure to traverse the various flow spaces and to resolve conflicts prior to triggering applications. By doing so, this ensures that only the highest priority and least conflicting applications are triggered. This comes at considerable performance and security benefits.

Figure 2:
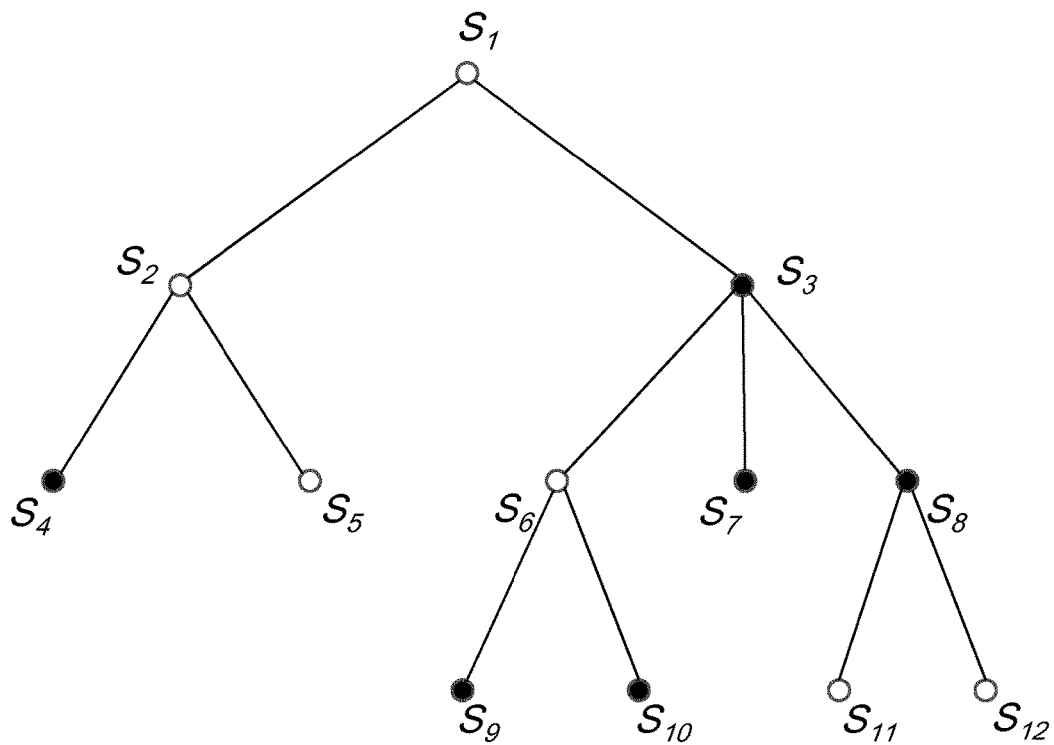
FIG. 2 is a schematic illustrating the concept of a flow space hierarchy in accordance with an embodiment of the invention.

A specific embodiment of dynamic conflict resolution of subscribed applications 6, which can be applied in an SDN network architecture as described above in connection with FIG. 1, is illustrated in FIG. 2. Specifically, FIG. 2 depicts flow spaces S1-S12 hierarchically organized in a tree-based structure, with flow space S1 being the most global flow space and with flow spaces S9-S12 being the most local ones. In the illustrated embodiment S2 and S3 are subspaces of S1, S4 and S5 are subspaces of S6, etc. It is noted that flow spaces may overlap. In order to efficiently compute the applications 6 to be triggered by the reference monitor 9, the following steps are executed:

1. In a first step the hierarchical structure of the flow spaces is stored in a tree, as shown in FIG. 2.
2. In a next step all flow spaces Si for the trigger event and for which an application 6 needs to be triggered are computed. This may be done by traversing the tree, starting at its root. At each node it is checked whether the message is in the node's flow space. If not, the scheme backtracks; otherwise, it continues with the node's children. Furthermore, if applications 6 need to be triggered for a node's flow space, this node is marked. In the embodiment of FIG. 2 the flow spaces indicated by solid dots (i.e. flow spaces S3, S4, S7, S8, S9, and S10) are flows spaces with triggered applications, while the flow spaces indicated by open dots (i.e. flow spaces S1, S2, S5, S6, S11, and S12) do not have any triggered applications.

As already mentioned above, a policy 10 implemented at the reference monitor 9 specifies how conflicts between the reactions of applications 6 are resolved. To this end, each flow space Si has assigned a priority and each subscribed application 6 has assigned a priority. In this regard is noted that priority can be given to the applications 6 that are in a more local flow space or a more global one. If priority is given to the most local flow spaces, which in the embodiment of FIG. 2 would be flow spaces S4 and S7-S10, then:

3. The tree is traversed from the root, and at each node of the tree, all the node's children are determined from which a flow space with an application that needs to be triggered is reachable. If the node has no such child, the flow space of the current node is returned. Otherwise, it is continued with the child node where the flow space has the highest priority.

The case where priority is given to the most global flow spaces (i.e. flow spaces S3 and S4 in FIG. 2) is handled analogously.

4. The application of the flow space from (3) with the highest priority is determined and triggered. This application is termed master application.
5. All applications of all the flow spaces from (2) that are not in conflict with the master application are triggered. The master application from (4) is not in conflict with itself.

Instead of resolving conflicts between applications, it is likewise possible to operate more coarse grained and to resolve conflicts between flow spaces. To this end the above solution can be reused, with the difference that, in addition to the master application from (4), only those applications are triggered that are related to the flow space from (3) and whose reactions to the trigger event do not conflict with the master application. Another variant is to determine for each of the flow spaces from (2) whether all its applications subscribed to the trigger event are not in conflict with the master application from (4). These applications from such a flow space are then only triggered if all of them are not in conflict with the master application.

The proposed access control scheme is the first comprehensive one for SDN controllers for restricting the access of network applications to the network resources. Equipping SDN controllers with a reference monitor, capable of enforcing policies of the proposed scheme, reduces the attack surface of SDN networks, in particular, multi-tenant SDN networks. Thus, the access control scheme according to the present invention adds fundamental security concepts to SDN controllers, e.g. based on OpenFlow, which are essential for the development of mature SDN network operating system for multi-application/multi-tenant settings.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of providing access control for a software defined network (SDN) controller to control access to network resources, the method comprising:
   triggering, by the SDN controller upon receiving a trigger event from a data plane of the software defined network, one or more applications that are installed to run at a control plane of the software defined network atop the SDN controller to react to the trigger event, and
   applying, by the SDN controller before triggering applications due to a trigger event, a conflict resolution scheme configured to resolve conflicts among the applications, the conflict resolution scheme comprising:
   determining all flow spaces that are affected by the trigger event and selecting from these flow spaces a single selected flow space having assigned a priority that complies with a predetermined policy,
   determining, from the applications related to the selected flow space, a single master application according to predefined criteria, and
   triggering, in addition to the master application, only those applications whose reactions to the trigger event do not conflict with the master application,
   wherein the flow spaces are objects on the control plane.

2. The method according to claim 1, wherein the flow spaces are hierarchically organized in a tree-based data structure.

3. The method according to claim 1, wherein a flow space is defined as a tuple comprising a parameter that specifies a set of packet headers, a parameter that specifies a set of actions, and a parameter that specifies a set of attributes.

4. The method according to claim 1, wherein according to a predetermined policy, priority is given to flow spaces that are more local with respect to the flow space hierarchy.

5. The method according to claim 1, wherein according to a predetermined policy, priority is given to flow spaces that are more global with respect to the flow space hierarchy.

6. The method according to claim 1, wherein an application with the highest priority is determined, from the applications related to the selected flow space, as the master application.

7. The method according to claim 1, wherein, in addition to the master application, only those applications are triggered that are related to the selected flow space and whose reactions to the trigger event do not conflict with the master application.

8. The method according to claim 1, wherein users are empowered to install and run their own applications at the control plane atop the controller.

9. The method according to claim 1, wherein the installation of an application the specification of reactions of the application.

10. The method according to claim 1, wherein applications that are in conflict with each other in terms of their reaction are pre-computed.

11. The method according to claim 1, wherein the trigger event includes at least one packet-in event sent by a switch of the software defined network to the SDN controller when the switch receives a packet that does not match any of the entries in a flow table of the switch.

12. A software defined network (SDN) controller, the controller being configured to execute a method according to claim 1.

13. A software defined network (SDN) with access control to control access to network resources, the SDN comprising:
a network device comprising a controller that is configured, upon receiving a trigger event from a data plane of the software defined network, to trigger one or more applications that are installed to run at a control plane of the software defined network atop the controller to react to the trigger event,
wherein the controller is further configured, before triggering applications due to the trigger event, to apply a conflict resolution scheme configured to resolve conflicts among the applications, the conflict resolution scheme comprising:
determining all flow spaces that are affected by the trigger event and selecting from these flow spaces a single selected flow space having assigned a priority that complies with a predetermined policy,
determining, from the applications related to the selected flow space, a single master application according to predefined criteria, and
triggering, in addition to the master application, only those applications whose reactions to the trigger event do not conflict with the master application, and
wherein the flow spaces are objects on the control plane.

14. The network according to claim 13, wherein the controller comprises a north-bound Advanced Programming Interface (API) that is configured to be employed by users for installing and running their own applications at the control plane atop said controller.

15. The network according to claim 13, wherein the controller comprises a reference monitor that is configured to execute the conflict resolution scheme.

16. The network according to claim 15, wherein the reference monitor is configured to pre-compute applications that are in conflict with each other in terms of their reaction.

17. The Network according to claim 16, wherein the reference monitor is configured to pre-compute the applications each time a new application is installed.

18. The method of claim 10, wherein applications that are in conflict with each other in terms of their reaction are pre-computed each time a new application is installed.

* * * * *